Sept. 9, 1958

H. E. HOLLMANN 2,851,685

DUPLEX RADIO COMMUNICATION

Filed May 25, 1954

2 Sheets-Sheet 1

INVENTOR
HANS E. HOLLMANN
BY
[signature]
ATTORNEY

INVENTOR
HANS E. HOLLMANN
BY
[signature]
ATTORNEY

United States Patent Office 2,851,685

Patented Sept. 9, 1958

2,851,685

DUPLEX RADIO COMMUNICATION

Hans E. Hollmann, Oxnard, Calif., assignor to Radio Patents Company, New York, N. Y., a partnership Application May 25, 1954, Serial No. 432,264

17 Claims. (Cl. 343—178)

The present invention relates to means for and a method of duplex radio communication, more particularly to systems of this type utilizing at least one superregenerative transceiver cooperating with a similar transceiver or with a passive responder constituting the opposite end of a duplex communication link.

As is well known, intelligence signals may be transmitted by means of a radio frequency carrier oscillation which is subjected to modulation at the transmitter and to the inverse process of demodulation or detection at the receiver. Conventionally, modulation and demodulation are carried out separately and independently and are therefore performed by different devices or circuits. Basically, however, modulators as well as demodulators operate according to the principle of reciprocity in that both are non-linear electrical circuit elements.

Duplex or two-way communication is commonly achieved by means of two transceivers, each being comprised of a transmitter and a receiver with their associated modulators and demodulators and operating on different carrier frequencies.

An object of the present invention is the provision of a simple method of and apparatus for duplex radio communication using the same or slightly different carrier frequencies for communication in both directions, such as by means of a pair of identical transceivers or by means of a single transceiver cooperating with a passive responder as a counter station.

A more specific object is the utilization of non-linear resistors as a means for both modulation and demodulation, respectively, of the transmitted and received carrier signals;

Another object is the provision of a simplified superregenerative transceiver for use in two-way or duplex radio communication.

Still another object is the combination of modulation and demodulation in a single electronic device.

A further object of the invention is the provision of simple and efficient means for and a method of simultaneous modulation and demodulation of the quenching pulses of a superregenerator transceiver for two-way or duplex comunication between two radio stations.

The invention, both as to its further objects and novel aspects, will be better understood from the following detailed description taken in reference to the accompanying drawings, forming part of this specification and wherein.

Like reference characters identify like elements in the different views of the drawings.

Figure 1:
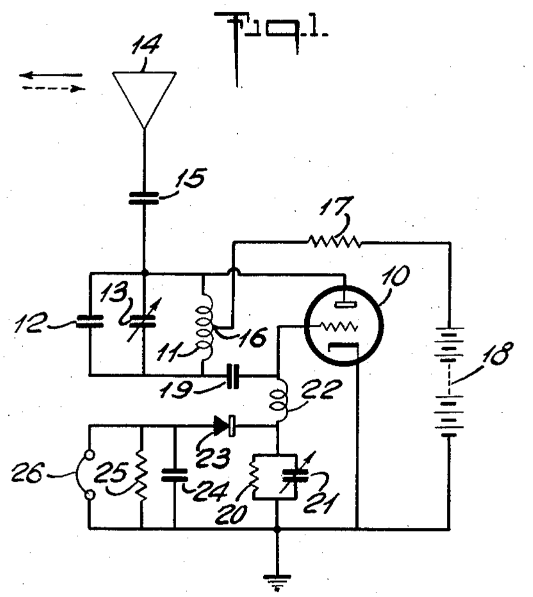
Fig. 1 is a circuit diagram of a self-quenched superregenerative transceiver embodying a duplex modulation and demodulation circuit constructed in accordance with the principles of the invention.

Referring more particularly to Fig. 1, there is shown a circuit diagram of a simple self-quenched superregenerative transceiver suitable for duplex communication in accordance with the invention. As is understood, the communication link extends between two such transceivers having equivalent circuits and operating with the same or different carrier frequencies.

The transceiver shown comprises a triode 10 having a cathode, a control grid and a plate, which together with an oscillating or tank circuit comprised of an induction coil 11 shunted by a fixed condenser 12 and a variable condenser 13, forms a regenerative oscillator of the Hartley type commonly used at high frequencies. The radio frequency (R. F.) energy is radiated by an antenna 14 which is excited by the oscillator via a coupling condenser 15. The tank circuit 11—12—13 is connected between the grid and plate of the tube, while the plate voltage is impressed upon a suitable tap point 16 on the inductance 11, to provide optimum regenerative feedback. The resistor 17 in the plate circuit blocks the R. F. energy from the high-voltage battery or equivalent high voltage source 18 and at the same time serves to protect the tube from overloading. The grid coupling condenser 19 serves to block the plate voltage from the grid circuit.

Self-quenching is caused by the provision of a grid return network comprising a grid-leak resistor 20 shunted by a condenser 21, the choke coil 22 serving to block the R. F. voltage from the grid return circuit. In operation, a grid current builds up under the influence of R. F. oscillations and produces a negative voltage across the condenser 21 with respect to ground. As soon as this negative grid voltage has reached a value sufficient to block the tube, the R. F. oscillations are cut off, thus causing the grid condenser 21 to discharge through the leak resistor 20. In this manner "self-squegging" occurs in the form of relaxation oscillations having a period which, in a first order approximation, equals the time constant $C_gR_g$ of the grid return network, whereby $C_g$ is the numerical value of the capacity of condenser 21 and $R_g$ is the resistance of the grid leak 20.

Control of the superregeneration is effected by selecting the proper grid leak resistor 20 and varying the grid condenser 21. More specifically, if the time constant $C_gR_g$ approaches the R. F. period, the oscillator will pass from squegging into the state of continuous oscillations with no self-quenching present. On the other hand, too large a time constant causes a state of coherence in which each quench pulse builds up from the tail of the preceding pulse. Between these extremes, there is a range for the product $C_gR_g$ within which correct self-quenching takes place, which condition may be ascertained by the well known hiss in the headphone or loudspeaker of the conventional superregenerative receiver.

Instead of using a relaxation type self-quenching circuit as shown in Fig. 1, a hybrid circuit may be utilized, whereby the superregenerator acts as its own quench oscillator by virtue of a separate feedback circuit for the quench oscillations. Such a circuit is more easily controlled than the relaxation type but is more difficult to comprehend with respect to the duplex modulation and demodulation according to the invention.

The conventional method for deriving output signals from a superregenerative receiver is based on the fluctuations of the plate current and, therefore, a headphone, output transformer or the like may be directly inserted in the plate circuit of the oscillator. According to the present invention, the output signals are derived from the quench oscillations. For this purpose, the relaxation network 20—21 is shunted by a non-linear resistor 23, such as a diode, dry rectifier, etc. in series with a filter network comprising a condenser 24 and resistance 25 in parallel. The filter 24—25 is in turn shunted by an electromagnetic telephone-microphone 26 or equivalent transducer capable of directly converting sound or pressure changes into electrical voltage or potential changes and vice versa. If desirable, the headphone or the like 26 may be replaced by an output transformer which drives an audio amplifier and loudspeaker. Realizing that the plate-current fluctuations are the result of changes of the average grid potential and this, in turn, of the quench frequency fluctuations, it is easily seen that the modulation of the quench pulses by incoming signals is the primary cause for the superregenerative detection. In other words, the detector 23 acts as a demodulator of the quench oscillations, while in the conventional superregenerator the function of demodulation is performed by the tube itself. Experiments have shown that the described detection via the quench pulses is equivalent to the prior art demodulation in the plate circuit and that the incoming signals can be received in the headphone 26 with the same volume and quality as by a headphone connected in the plate circuit, especially if the superregenerator operates in the linear mode.

Figure 2:
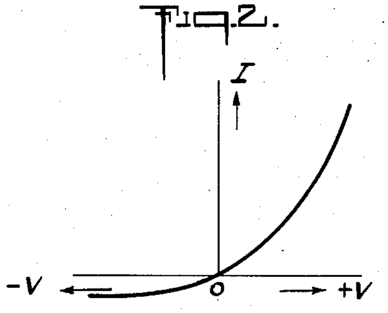
Figs. 2 and 3 are graphs showing the current-voltage and impedance-voltage characteristics, respectively, of a crystal diode utilized for the purpose of the invention.
Figure 3:
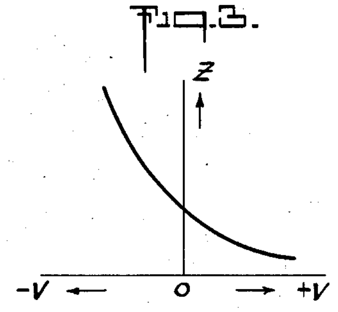

According to the present invention, the diode 23 serves also for the modulation of the R. F. carrier radiated during the oscillation periods of the transceiver. This duplex function of modulator and demodulator will be better understood by reference to Figs. 2 and 3. Fig. 2 illustrates the non-linear current-voltage characteristic of a crystal diode or equivalent non-linear resistor, I representing the current as a function of the impressed voltage E. As is well known and seen from the drawing, the characteristic has two major branches in the forward and reverse directions, respectively. Accordingly, the dynamic impedance Z of the diode is determined by the slope of the I—V characteristic at any momentary bias voltage V, as shown in Fig. 3.

More particularly, in the superregenerative circuit shown by Fig. 1, the diode 23 offers its dynamic impedance to the quench oscillations and shunts the grid leak resistor 20. As a result, the diode controls both the frequency as well as the amplitude of the quench oscillations, both effects manifesting themselves in associated fluctuations of the carrier energy. Consequently, the headphone 26 in Fig. 1 may be used as an electrodynamic microphone producing voice voltages which control the impedance Z of the diode 23. This in turn produces, by way of pulse modulation of the quench oscillations, an amplitude modulation of the carrier frequency pulses radiated by the antenna 14. This amplitude modulation has a maximum sensitivity if the superregenerator operates in its logarithmic mode, it having been found that a self-quenched superregenerator, in addition to a modulation of its pulse rate or quench frequency, also exhibits a type of linear and logarithmic mode of variation of the pulse amplitude, in a manner similar to a separately quenched regenerator operated with a fixed or constant quench frequency. Under this condition, the modulation sensitivity is sufficient to produce a reasonable faithful amplitude modulation without a pre-amplifier, that means by simply talking into the headphone 26.

With the foregoing explanation of the duplex modulation and demodulation of a self-quenched superregenerator in mind, the use of a pair of these transceivers for a simultaneous two-way communication can easily be understood. Most efficient operation requires a synchronization of the quench pulses of both transceivers so that the radiated pulses from one transceiver arrive during the most sensitive periods of the other transceiver and vice versa. Perfect synchronization of the quench frequencies of both transceivers is however not necessary and the quench frequencies of the individual transceivers may differ from one another to a certain extent, provided that their difference or beat frequency remains above the audible range in case of speech transmission or generally above the highest modulation frequency component of the intelligence or signals to be transmitted. In this case, an exact time and phase relationship between transmitted and received pulses is not absolutely necessary.

Figure 4:
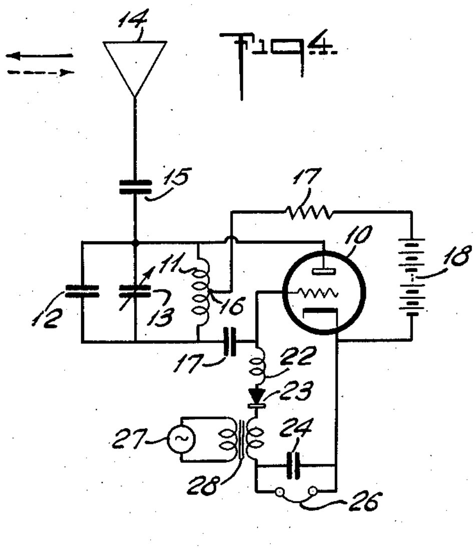
Fig. 4 is a circuit diagram showing a separately quenched superregenerative transceiver embodying the features and principles of the invention.

The use of separate quenching renders the adjustment and operation of the transceivers much easier, because the amplitude and frequency of the quench oscillations are independent of the characteristics and performance of the superregenerative oscillator itself. Thus, Fig. 4 shows a simple circuit diagram of a separately quenched transceiver according to the invention embodying a regenerative oscillator similar to that shown in Fig. 1, while the quench oscillations produced by a separate oscillator 27 of any suitable type are impressed upon the grid of the oscillator tube 10 by way of a coupling transformer 28, or in any other suitable manner. The grid return circuit furthermore includes the diode 23, the R. F. choke 22 and the headphone 26, all connected in series, with the phone 26 being bypassed by a condenser 24, to provide a duplex detector and modulator, in substantially the same manner as in the case of Fig. 1. In the first place, the diode 23 rectifies the quench oscillations and therefore renders the incoming signals audible. In the second place, the induced headphone voltage controls the diode impedance Z and thus varies the quench amplitude impressed upon the grid. The result is the same as before, except that in the present case the quench frequency is constant and easier to adjust for optimum operation of the system.

As is understood, for optimum efficiency the quench frequencies of both cooperating transceivers, whether self-quenched or separately quenched, should be in perfect synchronism. On the other hand, it is not necessary, as pointed out, that each individual incoming pulse be utilized for the control of the local quenching pulses, in that the circuit may be operated at a "higher mode," whereby both quench frequencies may differ from one another to a certain extent, thus making unnecessary a correct synchronism control and greatly simplifying thereby the operation of the transceiver. In this case, that is, where the quench frequency in the receiving station differs from the quench frequency of the remote transceiver and, in turn, from the frequency of the incoming signal pulses, a lesser number of received pulses, determined by the difference or beat between the quench frequencies, will be available at or synchronized with the periods of highest sensitivity of the superregenerative receiver. As a result, the local quench frequency will be modulated, although at reduced efficiency, by the incoming signals in the same manner as in the case of perfect synchronization frequencies. For such an operation it is, however, necessary that the difference or beat between the quenching frequency is high compared with the highest modulation frequency component to be received, to avoid signal distortion and other defects. In other words, the system according to the invention has the advantage that no strict synchronism is required and relative fluctuations or deviation within limits between the quench frequencies will have little or no effect on the efficiency of the signal transmission.

Most efficient operation in both directions is furthermore insured, in case of perfect synchronism between the quench frequencies, if the R. F. pulses radiated by one transceiver are exactly midway between the R. F. pulses radiated by the other transceiver, i. e. in other words if the quench frequencies are displaced by 180° phase difference with respect to one another, and furthermore if the time delay as a result of the signal propagation time between the transceivers plus any additional artificial delay by special delay means inserted in the circuits are such as to cause the received pulses in each transceiver to coincide with the instants or periods of highest sensitivity preceding or coincident with the initiation of the oscillations as a result of the superregenerative action.

In the case of the self-quenched superregenerator which operates in a more complex manner than the separately quenched type in that the quench frequency is varied under the influence of the incoming signals, a difference between the quench frequencies leads to a type of "locking injection" in that different quench frequencies exhibit a tendency to synchronize one another automatically in ratios of 1:1, 1:2, 2:1. Provided that the quench frequencies do not differ too much and provided further that the field strength of the incoming R. F. signal pulses exceeds a certain threshold value, locking injection takes place and causes the quench frequencies to be automatically maintained in locked synchronism. More specifically, the lower quench frequency is increased until it equals the higher quench frequency. If the ratio deviates from 1:1 a beat phenomenon is superimposed causing each second, third, etc. incoming pulse to be effective in controlling or modulating the local oscillation pulses, in a manner understood from the foregoing.

The duplex modulation and demodulation according to the invention by means of a single non-linear element is not confined to systems comprising a pair of transceivers, but has been found to offer similar advantages for semi-passive communication, where only one of the stations, such as a transceiver according to either Fig. 1 or Fig. 4 is powered and the cooperating station is constituted by a passive responder having no local power source, such as a responder of the type described for example in my application.

Figure 5:
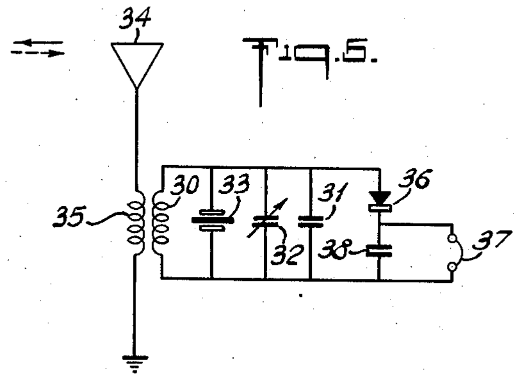
Fig. 5 is a circuit diagram of a passive responder constructed according to the invention and suitable for cooperating with a transceiver for effecting semi-passive duplex communication.

In other words, one of the two transceivers is replaced with a passive responder, that is, a device with no local power and without any active elements such as vacuum tubes, transistors or other devices requiring a local power source for their operation. A passive responder of this type utilizing a piezoelectric delay device is shown in Fig. 5. The responder shown comprises essentially a tank circuit constituted by an inductance 30 shunted by a fixed condenser 31 and a variable condenser 32, as well as by a piezoelectric crystal or storage element 33 for delaying the incoming R. F. pulses. The incoming or primary signal pulses are received and re-radiated as delayed or secondary pulses by an antenna 34 coupled with the tank circuit 30—31—32 through a coupling coil 35. If desired, the piezocrystal 33 may be coupled with the tank circuit 30—31—32 through a separate coupling element, either capacitatively or inductively, to provide optimum adaptation or impedance matching, in a manner readily understood.

In operation, the crystal 33 stores the incoming R. F. pulse energy and then re-radiates the stored energy in the form of delayed or secondary R. F. pulses back to the master station which may be a superregenerative transceiver according to either Fig. 1 or Fig. 4. The returning echo pulses are in a well-defined relationship to the primary pulses or delayed by the delay time caused by the crystal in addition to twice the propagation time between the remote transceiver and responder. Optimum efficiency requires that the quench period is equal or almost equal to the over-all delay or echo time. The delay caused by the crystal may be due to coupling oscillations between the crystal acting as output circuit and the tank circuit 30—31—32 or input circuit properly coupled therewith or due to reflection or reverberation of the vibratory pulses induced in the crystal by the incoming R. F. signal pulses, as described in greater detail in my above-mentioned copending application.

According to the invention, the crystal 33 of the passive responder is shunted by a diode 36 in series with the headphone 37 by-passed by a condenser 38. As will be understood from the foregoing, the network 36—37—38 operates as a demodulator as well as a modulator in substantially the same manner as pointed out. Whereas, however, the modulator-demodulator in the case of a powered transceiver, Figs. 1 and 4, controls the quench oscillations, the modulator-demodulator of the passive responder of Fig. 5 varies the quality factor or "Q" of the R. F. circuit, thus causing the secondary or delayed signal pulses transmitted in the reverse direction by the antenna 34 to be amplitude modulated in accordance with the speech variations impressed by the headphone 37 operated as a microphone, in substantially the same manner as described hereinabove. In the forward direction, i. e. from the active superregenerator to the passive responder, the non-linear resistor operates as a conventional detector without the inaudible pulses entering the picture. Another explanation of the duplex modulation and demodulation according to the invention is that, in the forward direction, the diode 36 acts as a well-known detector or rectifier and in the reverse direction produces a Q-modulation of the responder's tank circuit or resonant system. The high non-linearity of conventional crystal diodes insures a sufficient high sensitivity in both directions, i. e. a high sensitivity as detector as well as a high degree of Q-modulation without the necessity of utilizing a pre-amplifier.

Figure 6:
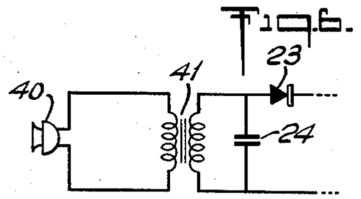
Figs. 6 to 8 are partial diagrams showing modifications of a duplex modulator-demodulator of the type shown according to the invention.

While an electromagnetic telephone or transducer 26 has been shown in the drawing as a composite modulator-demodulator in conjunction with the diode 23, it will be understood that an equivalent device capable of converting mechanical vibrations into electric current changes and vice versa may be employed for the purpose of the invention. Thus, a piezoelectric microphone-headphone converter 40 may be substituted for the electromagnetic headphone, being suitably coupled with the diode circuit through a matching transformer 41, in the manner shown in Fig. 6.

Figure 7:
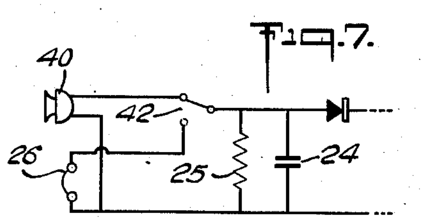
Figure 8:
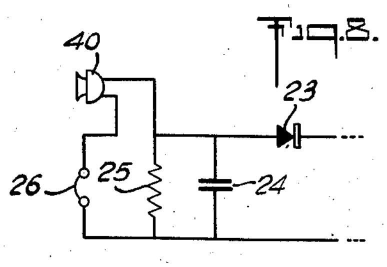

Furthermore, it is possible to use separate converters as a microphone and receiver operated alternately during transmission and reception, respectively. Thus, Fig. 7 shows a headphone 26 and a piezoelectric microphone 40 selectively connectible to the diode circuit by a voice switch 42. According to a simplified arrangement, this switch may be dispensed with by connecting the headphone 26 and microphone 40 in series and across the low-pass filter of the diode circuit, as shown in Fig. 8, which latter provides the most practical arrangement for duplex operation without a voice switch according to the invention.

There is thus provided by the present invention a simple and efficient system for and method of duplex communication utilizing a single element in the form of a non-linear resistor as a means for both modulating the outgoing signals and for demodulating the received signals, as described with reference to the illustrative devices and circuits shown by the drawings. As will be evident, variations and modifications, as well as the substitution of equivalent elements for those shown and described for illustration, may be made without departing from the broader scope and spirit of the invention as defined by the appended claims. The specification and drawing are accordingly to be regarded in an illustrative rather than in a limiting sense.

I claim:

1. In combination with a transceiver for two-way radio communication of the type included a single circuit traversed by high frequency current modulated both by the signals being transmitted and received, respectively, a duplex modulator-demodulator comprising a resistance element separate from said circuit and having non-linear current-voltage characteristic, a two-way transducer adapted to convert signal variations into proportionate voltage changes and vice versa, and means to connect said resistance element and transducer to said circuit, to effectively pass therethrough said high frequency current in series.

2. In combination with a transceiver for two-way radio communication of the type including a single circuit traversed by high frequency current modulated both by the signals being transmitted and received, respectively. a duplex modulator-demodulator comprising a crystal diode separate from said circuit, a two-way transducer adapted to convert signal variations into proportionate voltage changes and vice versa, and means to connect said diode and transducer to said circuit, to effectively pass said high frequency current therethrough in series.

3. In combination with a transceiver for two-way radio communication of the type including a single circuit traversed by high frequency current modulated both by the signals being transmitted and received, respectively, a duplex modulator-demodulator comprising a resistance element separate from said circuit and having a non-linear current-voltage characteristic, an electromagnetic two-way signal transducer adapted to convert pressure variations into electric voltage changes and vice versa, and means to connect said resistance element and said transducer to said circuit, to effectively pass said high frequency current therethrough in series.

4. In combination with a super-regenerative transceiver having separate oscillating and quenching frequency circuits, a duplex modulator-demodulator comprising a resistance element having a non-linear current-voltage characteristic, a two-way transducer adapted to convert signal variations into proportionate voltage changes and vice versa, and means to connect said resistance element and said transducer to said quenching frequency circuit, to effectively pass the quenching current therethrough in series.

5. In combination with a super-regenerative transceiver having separate oscillating and quenching frequency circuits, a duplex modulator-demodulator comprising a crystal diode, a two-way transducer adapted to convert signal variations into proportionate voltage changes and vice versa, and means to connect said rectifier and said transducer to said quenching frequency circuit, to effectively pass the quenching current therethrough in series.

6. In combination with a super-regenerative transceiver having separate oscillating and quenching frequency circuits, a duplex modulator-demodulator comprising a resistance element having a non-linear current-voltage characteristic, an electromagnetic transducer adapted to convert pressure variations into proportionate voltage changes and vice versa, and means to connect said resistance element and transducer to said quenching frequency circuit, to effectively pass the quenching current therethrough in series.

7. In combination with a passive responder for two-way radio communication of the type comprising a transceiver adapted to receive modulated primary high frequency signal pulses from a transmitting station and to retransmit the received pulses as delayed and modulated secondary signal pulses during the spacing intervals between said primary pulses, a duplex modulator-demodulator comprising a resistance element having a non-linear current-voltage characteristic, a two-way transducer adapted to convert signal variations into proportionate voltage changes and vice versa, and circuit connections between said transceiver, said resistance and said transducer, to effectively impress said primary and secondary signal pulses upon said resistance and said transducer in series.

8. In combination with a passive responder for two-way radio communication of the type comprising a transceiver adapted to receive modulated primary high frequency signal pulses from a transmitting station and to retransmit the received pulses as delayed and modulated secondary signal pulses during the spacing intervals between said primary pulses, a duplex modulator-demodulator comprising a resistance element having a non-linear current-voltage characteristic, an electromagnetic transducer adapted to convert pressure variations into proportionate voltage changes and vice versa, and circuit connections between said transceiver, said resistance element and said transducer, to effectively impress said primary and secondary signal pulses upon said resistance and transducer in series.

9. In combination with a passive responder for two-way radio communication of the type comprising a transceiver for receiving primary modulated high frequency signal pulses from a transmitting station and retransmitting the received pulses as modulated and delayed secondary signal pulses during the spacing intervals between said primary pulses, a duplex modulator-demodulator comprising a crystal diode, a two-way transducer adapted to convert signal variations into proportionate voltage changes and vice versa, and circuit connections between said transceiver, said diode and said transducer, to effectively impress said primary and secondary signal pulses upon said diode and said transducer in series.

10. In a passive responder for duplex communication of the type comprising an antenna for receiving primary modulated high frequency signal pulses from a transmitting station and a piezoelectric delay element coupled to said antenna to delay and retransmit the received pulses as passive modulated secondary signal pulses during the spacing intervals between said primary pulses, a duplex modulator-demodulator comprising a resistance element having a non-linear current-voltage characteristic and connected to said antenna, and a two-way transducer adapted to convert signal variations into proportionate electric energy changes and vice versa and connected in series with said element.

11. In a passive responder for duplex communication of the type comprising an antenna for receiving modulated primary high frequency signal pulses from the transmitting station and a piezoelectric delay element coupled to said antenna to delay and retransmit the received pulses as passive modulated secondary signal pulses during the spacing intervals between said primary pulses, a duplex modulator-demodulator comprising a crystal diode connected to said antenna, and an electromagnetic transducer adapted to convert signal variations into proportionate voltage changes and vice versa and connected in series with said diode.

12. In a transceiver for duplex communication of the type including a circuit traversed by high frequency current being alternately modulated by the signals being transmitted and received, respectively, the provision of a resistance element separate from and connected to said circuit, said resistance element having a non-linear current-voltage characteristic, to produce demodulated received signals, and biasing means for said resistance adapted to convert modulating signal variations to be transmitted into proportionate voltage changes, to correspondingly vary said resistance and to effect modulation of said high frequency current.

13. In a transceiver for duplex communication of the type including a circuit traversed by high frequency current being alternately modulated by the signals being transmitted and received, respectively, the provision of a crystal diode connected to said circuit, to produce demodulated received signals, biasing means for said diode adapted to convert modulating signal variations to be transmitted into proportionate voltage changes, to correspondingly vary the resistance of said diode and to effect modulation of said high frequency current.

14. A superregenerative transceiver for duplex radio communication of the type having separate circuits traversed by oscillating and quenching frequency currents, respectively, whereby modulation of the quenching current causes a modulation of the transmitted high frequency pulses and reception of modulated radio signals causes a corresponding modulation of said quenching currents, a duplex modulator-demodulator comprising a resistance connected to said quenching circuit and having a non-linear current-voltage characteristic, to produce demodulated received signals, and biasing means for said resistance adapted to convert modulating signal variations to be transmitted into proportionate voltage changes, to correspondingly vary said resistance and to effect modulation of said quenching current.

15. A superregenerative transceiver for duplex radio communication of the type having separate oscillating and quenching frequency circuits, respectively, whereby modulation of the quenching current causes a modulation of the transmitted high frequency pulses and reception of modulated radio signals causes a corresponding modulation of said quenching current, a duplex modulator-demodulator comprising a crystal diode connected to said quenching circuit, to produce demodulated received signals, and biasing means for said diode adapted to convert modulating signal variations to be transmitted into proportionate voltage changes, to correspondingly vary the resistance of said diode and to effect modulation of said quenching current.

16. In a passive responder of the type comprising a transceiver adapted to receive primary modulated signal pulses and to retransmit the received pulses as modulated delayed secondary signal pulses during the spacing intervals between said primary pulses, a duplex modulator-demodulator comprising a resistance having a non-linear current-voltage characteristic and connected to said transceiver to produce demodulated received signals, and biasing means for said resistance adapted to convert modulating signal variations to be transmitted by said responder into proportionate voltage changes, to correspondingly vary said resistance and to effect modulation of said secondary signal pulses.

17. In a passive responder of the type comprising a transceiver adapted to receive primary modulated high frequency signal pulses and to retransmit the received pulses as modulated delayed secondary signal pulses during the spacing intervals between said primary pulses, a duplex modulator-demodulator comprising a crystal diode connected to said transceiver to produce demodulated received signals, and biasing means for said diode adapted to convert passive modulating signals to be transmitted into proportionate voltage changes, to correspondingly vary the resistance of said diode and to effect modulation of said secondary signal pulses.

References Cited in the file of this patent

UNITED STATES PATENTS

| | | |
|---|---|---|
| 1,306,208 | Weagant | June 10, 1919 |
| 1,424,065 | Armstrong | July 25, 1922 |
| 1,650,250 | Bronk | Nov. 22, 1927 |
| 1,889,293 | Robinson | Nov. 29, 1932 |
| 2,024,138 | Armstrong | Dec. 17, 1935 |
| 2,133,648 | Pierce | Oct. 18, 1938 |
| 2,135,672 | Morris | Nov. 8, 1938 |
| 2,245,645 | Brown | June 17, 1941 |
| 2,319,627 | Perlman | May 18, 1943 |
| 2,320,428 | Hansell | June 1, 1943 |
| 2,412,710 | Bradley | Dec. 17, 1946 |
| 2,504,636 | Bradley | Apr. 18, 1950 |
| 2,515,726 | Montain | July 18, 1950 |
| 2,561,851 | Fryklund | July 24, 1951 |
| 2,611,037 | Napoli | Sept. 16, 1952 |
| 2,625,650 | Spencer | Jan. 13, 1953 |
| 2,772,352 | Tellier | Nov. 27, 1956 |